Jan. 30, 1968     R. E. MYER     3,366,953
SIMPLIFIED RADAR RANGE UNIT
Filed Nov. 7, 1966
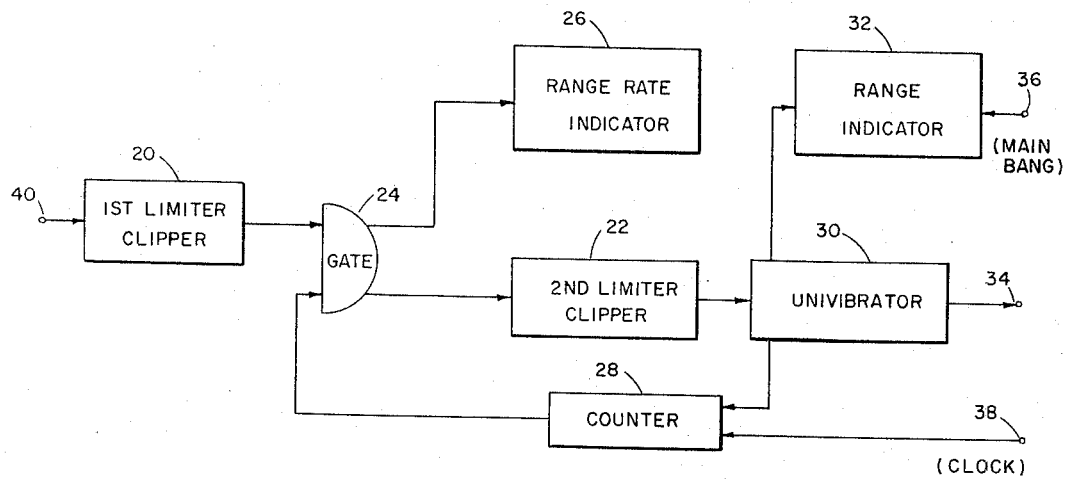
FIG. I
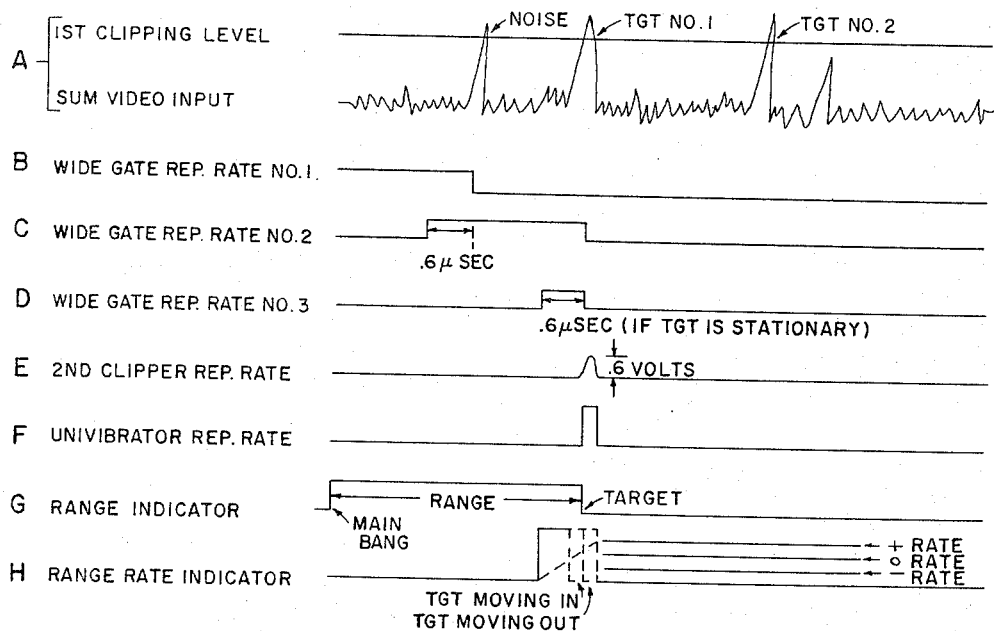
FIG. 2
Robert E. Myer,
INVENTOR.
BY Harry M. Saragovitz
Edward J. Kelly
Herbert Berl
Alfred E. Smith

3,366,953
SIMPLIFIED RADAR RANGE UNIT
Robert E. Myer, Denville, N.J., assignor, by mesne assignments, to the United States of America as represented by the Secretary of the Army
Filed Nov. 7, 1966, Ser. No. 592,575
5 Claims. (Cl. 343—7.3)

ABSTRACT OF THE DISCLOSURE

A radar range circuit that will automatically acquire and track a target and provide range and range rate information in either analog or digital form. The circuit includes a normally open wide gate which is closed by any pulse which passes the threshold of a limiter clipper. The wide gate then remains closed for one full repetition period minus 0.6 microsecond at which time it opens and remains open until another pulse comes in.

---

This invention relates to a radar range unit and more particularly to a simplified radar range unit for limited capability applications.

This range circuit was developed for use in radar systems when the more complex data processing units are inoperative, unavailable, or undesirable for certain strategic locations. The range circuit provides a simple means for gating a target such as an aircraft and will automatically acquire, track, gate the target and supply range and range rate information in analog or digital form.

An object of this invention is to provide a simple range unit for limited capability application.

A further object of this invention is to provide a simple means for tracking gate activation.

Another object of this invention is to provide a means for rapid automatic acquisition of a target.

Other objects and possible uses and advantages of this invention will be betted understood from the following detailed description and from the accompanying drawing illustrating an example of the invention and wherein:

FIGURE 1 is a circuit diagram incorporating a preferred embodiment of the invention; and FIGURE 2 is a time sequence diagram showing the relative action of the range unit with respect to a target.

Referring now to the drawing, FIGURE 1 discloses a circuit diagram representing one embodiment of the invention. A first limiter clipper stage 20 has an input connected to a terminal 40 whereby the linear sum video received is applied to the circuit. An output of the first clipper 20 is connected on a first input to a wide gate 24. A second limiter clipper stage 22 has an input connected to a first output of the wide gate 24, and a range rate indicator 26 is connected to a second output of wide gate 24. A counter circuit 28, having an output and first and second inputs, has the output connected to a second input of wide gate 24 and the first input connected to a clock input terminal 38. The second input of counter circuit 28 is connected to a first output of a univibrator 30 which has an input connected to an output of the second clipper stage 22. A second output of univibrator 30 supplies a pulse to a terminal 34 for controlling tracking equipment, and a third output of univibrator 30 is connected to a first input of range indicator 32. A terminal 36 connected to a second input of range indicator 32 provides the main bang signal thereto.

The received linear sum video is applied to terminal 40 and thereby to the first clipper 20 which is initially adjusted to pass only signals which are more than 12 decibels above the system noise level under maximum gain conditions. These clipped signals, which may be targets or large noise pulses, pass to the wide gate 24 which is normally open but is closed by any pulse which passes the threshold of the first clipper 20. Wide gate 24 will remain closed for one full repetition period minus 0.6 microsecond, at which time it opens and remains open until another pulse comes in. The first pulse which passes the clipper 20, as shown in FIGURE 2A, and closes gate 24 will trigger the second clipper 22. This clipper passes only the top 0.6 volt of each pulse that comes through, as shown in FIGURE 2E, and applies it to the input of univibrator 30. The univibrator generates a signal as shown in FIGURE 2F for the tracking channel and applies it to terminal 34. It also starts counter 28 which opens the wide gate 0.6 microsecond less than one repetition period later. When counter 28 opens gate 24, a signal from gate 24 activates range rate indicator 26. The second video pulse, and succeeding pulses in each following repetition period, passed by clipper 20 closes gate 24. The circuit functions as previously stated with the additional fact that range rate indicator 26 is deactivated. Therefore, indicator 26 indicates a rate based on the time that gate 24 is closed, and the time that gate 24 is closed is based on the velocity and direction of the target.

If the first pulse in a repetition period is a target echo, it will close gate 24, as shown in FIGURE 2C, and 0.6 microsecond before the target echo occurs in the next repetition period the gate will open again, as shown in FIGURE 2D, and the target will be acquired and tracked. The 0.6 microsecond time allows for the maximum range change possible at this repetition rate. This system will automatically acquire the first target within a few repetition periods after it appears, by this method. If the first pulse to pass the first clipper 20 is a noise pulse the gate 24 will close, as shown in FIGURE 2B, and 0.6 microsecond before the next repetition period, the gate will open and remain open until the next pulse comes in, as shown in FIGURE 2C. The possibility of a second noise pulse occurring one repetition period after a first noise pulse is rare; however, even if this should occur and tracking begins, it will cease during a following repetition period when the noise pulse is not present. The number of noise pulses acquired per repetition period, or what might be called the acquisition search rate, can be controlled manually by changing the first clipping level.

Once a target has been acquired and tracked for several repetition periods, the clipping level could automatically be lowered to prevent losing the target if fading should occur. If during track, an occasional noise pulse should trigger the gate closed before the target appears, the next repetition period would return it to track.

Range can be determined digitally by starting a counter at main bang, as shown in FIGURE 2G, and stopping it with the tracking signal applied to terminal 34. By using the time that gate 24 is closed as a measure of range rate for each repetition period, the range rate can be determined. If the gate is 0.6 microsecond in width, the target is not moving; if it is less, range is decreasing and if it is greater than 0.6 microsecond, range is increasing, as shown in FIGURE 2H. A departure of 0.5 microsecond from the normal 0.6 microsecond width of the gate is equivalent to a velocity of about 8,000 yards per second.

Although a particular embodiment and form of this invention has been illustrated, it is understood that modifications may be made by those skilled in the art without departing from the true scope and spirit of the foregoing disclosure.

What is claimed is:

1. A simplified radar range unit comprising: means for receiving and passing only signals having a predetermined magnitude; a normally open gate circuit having a first input connected to said receiving means and operably responsive to the output thereof to be placed in a closed condition; and means for maintaining said gate circuit closed for a predetermined period after operation thereof.

2. A range unit as set forth in claim 1 wherein means for receiving and passing signals is a first limiter clipper.

3. A range unit as set forth in claim 2 wherein the means for maintaining said gate circuit closed comprises a second limiter clipper connected to an output of said gate circuit, a univibrator connected to an output of said second clipper, and a counter connected to a first output of said univibrator and to a second input of said gate circuit.

4. A range unit as set forth in claim 3 wherein said counter is connected to a clock input terminal, a second output of said univibrator is connected to a tracking equipment terminal; and wherein said unit further includes a range indicator having a first input connected to a third output of said univibrator and a second input of said range indicator being connected to a main bang input terminal.

5. A range unit as set forth in claim 4 further comprising a range rate indicator connected to a second output of said wide gate.

References Cited

UNITED STATES PATENTS

| | | | |
|---|---|---|---|
| 2,740,112 | 3/1956 | Goldberg | 343—7.3 |
| 3,222,671 | 12/1965 | Di Matteo | 343—7.3 |

RODNEY D. BENNETT, *Primary Examiner.*

C. L. WHITHAM, *Assistant Examiner.*